United States Patent
Ruslyakov et al.

(10) Patent No.: US 10,789,136 B1
(45) Date of Patent: Sep. 29, 2020

(54) GRANULAR RECOVERY USING HOT-PLUG VIRTUAL DISKS

(71) Applicants: Alexey A. Ruslyakov, Moscow Region (RU); Maxim V. Lyadvinsky, Moscow (RU); Emil Manukyan, Yerevan (AM); Serguei M. Beloussov, Costa del Sol (SG)

(72) Inventors: Alexey A. Ruslyakov, Moscow Region (RU); Maxim V. Lyadvinsky, Moscow (RU); Emil Manukyan, Yerevan (AM); Serguei M. Beloussov, Costa del Sol (SG)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 0 days.

(21) Appl. No.: 14/320,422

(22) Filed: Jun. 30, 2014

Related U.S. Application Data

(60) Provisional application No. 61/869,480, filed on Aug. 23, 2013, provisional application No. 61/869,467, filed on Aug. 23, 2013, provisional application No. 61/869,470, filed on Aug. 23, 2013.

(51) Int. Cl.
  *G06F 11/00* (2006.01)
  *G06F 11/14* (2006.01)
  *H04L 29/08* (2006.01)

(52) U.S. Cl.
  CPC ...... *G06F 11/1469* (2013.01); *G06F 11/1451* (2013.01); *G06F 11/1464* (2013.01); *H04L 67/10* (2013.01)

(58) Field of Classification Search
  CPC ............. G06F 11/1435; G06F 11/1448; G06F 11/1451; G06F 11/1453; G06F 11/1469; G06F 11/1484
  USPC .................................................. 714/6.1, 6.3
  See application file for complete search history.

(56) References Cited

U.S. PATENT DOCUMENTS

| | | | |
|---|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |

(Continued)

*Primary Examiner* — Elmira Mehrmanesh
(74) *Attorney, Agent, or Firm* — K&L Gates LLP

(57) ABSTRACT

A method, computer program product, computing system, and system for using hot-plug virtual disks in granular recovery are described. The method may include receiving, at a cloud computing site, a backup configuration including a list of protected resources associated with a cloud computing tenant. The method may further include mounting a hot-plug virtual disk to a virtual machine including the protected resources associated with the cloud computing tenant. The method may also include collecting metadata corresponding to the protected resources associated with the cloud computing tenant. The method may additionally include generating, at the cloud computing site, a backup of the virtual machine including the protected resources associated with the cloud computing tenant. Moreover, the method may include storing the metadata corresponding to the protected resources associated with the cloud computing tenant and storing the backup of the virtual machine including the protected resources associated with the cloud computing tenant.

9 Claims, 4 Drawing Sheets

(56) References Cited

U.S. PATENT DOCUMENTS

| | | | |
|---|---|---|---|
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,925,622 B2 * | 4/2011 | Chapman | G06F 11/1451 707/609 |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,539,137 B1 * | 9/2013 | Protassov | G06F 3/0619 711/203 |
| 8,645,748 B1 | 2/2014 | Chepel et al. | |
| 8,683,156 B2 * | 3/2014 | Bahadure | G06F 3/0605 711/162 |
| 8,719,286 B1 * | 5/2014 | Xing | G06F 11/1451 707/755 |
| 8,732,121 B1 | 5/2014 | Zorin et al. | |
| 8,856,927 B1 | 10/2014 | Beloussov et al. | |
| 8,954,544 B2 * | 2/2015 | Edwards | G06Q 10/10 707/649 |
| 8,996,468 B1 * | 3/2015 | Mattox | G06F 11/00 707/650 |
| 8,996,830 B1 | 3/2015 | Lyadvinsky et al. | |
| 9,280,336 B2 * | 3/2016 | Poddar | G06F 8/63 |
| 2006/0225065 A1 | 10/2006 | Chandhok et al. | |
| 2007/0244938 A1 * | 10/2007 | Michael | G06F 11/1458 |
| 2007/0260831 A1 * | 11/2007 | Michael | G06F 9/4401 711/162 |
| 2010/0011178 A1 | 1/2010 | Feathergill | |
| 2010/0070725 A1 * | 3/2010 | Prahlad | G06F 11/1453 711/162 |
| 2011/0047195 A1 * | 2/2011 | Le | G06F 17/30091 707/827 |
| 2011/0047340 A1 * | 2/2011 | Olson | G06F 11/1456 711/162 |
| 2012/0158806 A1 * | 6/2012 | Snyder | H04L 67/1097 707/827 |
| 2012/0290630 A1 * | 11/2012 | Aizman | G06F 17/30233 707/827 |
| 2012/0310888 A1 * | 12/2012 | Kuznetzov | G06F 9/45533 707/639 |
| 2014/0089916 A1 * | 3/2014 | Gross | G06F 11/0712 718/1 |
| 2014/0344809 A1 * | 11/2014 | Jin | H04L 67/2823 718/1 |
| 2015/0074362 A1 * | 3/2015 | Mohl | G06F 3/0667 711/162 |
| 2015/0370639 A1 * | 12/2015 | He | G06F 11/1451 711/162 |

\* cited by examiner

GRANULAR RECOVERY USING HOT-PLUG VIRTUAL DISKS

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: U.S. patent application Ser. No. 14/320,393 entitled "Configuring Backup and Recovery Routines in a Cloud Environment" filed on Jun. 30, 2014; U.S. patent application Ser. No. 14/320,409 entitled "Using A Storage Path To Facilitate Disaster Recovery" filed on Jun. 30, 2014; U.S. patent application Ser. No. 14/320,450 entitled "Hot Recovery of Virtual Machines" filed on Jun. 30, 2014; United States Patent Application No. entitled "Snapshotless Backup", filed on Jun. 30, 2014; U.S. patent application Ser. No. 14/320,510 entitled "Recovery of Virtual Machine Files Using Disk Attachment", filed on Jun. 30, 2014; U.S. patent application Ser. No. 14/320,526, filed on Jun. 30, 2014, now U.S. Pat. No. 9,858,154, entitled "Agentless File Backup of a Virtual Machine"; U.S. patent application Ser. No. 14/320,540, filed Jun. 30, 2014, now U.S. Pat. No. 10,002,052 entitled "Machine Replication"; U.S. patent application Ser. No. 14/320,546, filed on Jun. 30, 2014, entitled "Data Backup Parallelization"; and U.S. patent application Ser. No. 14/320,555 filed on Jun. 30, 2014, no U.S. Pat. No. 9,471,441, entitled "Systems and Methods for Backup of Virtual Machines".

TECHNICAL FIELD

The technical field may generally relate to cloud computing, and more particularly to recovery of resources in a cloud environment.

BACKGROUND

A cloud provider may administer a cloud computing site and run a cloud computing platform with multiple tenants, or cloud computing clients. The cloud computing site may administer multiple virtual machines in order to provide cloud services to the tenants. Cloud services may include provisioning applications, data, or other resources to the cloud computing clients. One or more of the tenants may require recovery capability for various applications, data, or other resources existing or running at the cloud computing site.

BRIEF SUMMARY

In an embodiment, a method for using hot-plug virtual disks in granular recovery may include receiving, at a cloud computing site, a backup configuration including a list of protected resources associated with a cloud computing tenant. The method may further include mounting a hot-plug virtual disk to a virtual machine including the protected resources associated with the cloud computing tenant. The method may also include collecting metadata corresponding to the protected resources associated with the cloud computing tenant. The method may additionally include generating, at the cloud computing site, a backup of the virtual machine including the protected resources associated with the cloud computing tenant. Moreover, the method may include storing the metadata corresponding to the protected resources associated with the cloud computing tenant and storing the backup of the virtual machine including the protected resources associated with the cloud computing tenant. In an implementation, the method may include storing the metadata corresponding to the protected resources at the virtual machine. The hot-plug virtual disk may be mounted to the virtual machine by a host agent running at a virtualization host. Further, the hot-plug virtual disk may include a guest agent that initiates a recovery procedure. Also, the metadata corresponding to the protected resources may include an application item database location.

In an embodiment, a computer program product may reside on a computer readable storage medium and may have a plurality of instructions stored on it. When executed by a processor, the instructions may cause the processor to perform operations for using hot-plug virtual disks in granular recovery. The operations may include receiving, at a cloud computing site, a backup configuration including a list of protected resources associated with a cloud computing tenant. The operations may further include mounting a hot-plug virtual disk to a virtual machine including the protected resources associated with the cloud computing tenant. The operations may also include collecting metadata corresponding to the protected resources associated with the cloud computing tenant. The operations may additionally include generating, at the cloud computing site, a backup of the virtual machine including the protected resources associated with the cloud computing tenant. Moreover, the operations may include storing the metadata corresponding to the protected resources associated with the cloud computing tenant and storing the backup of the virtual machine including the protected resources associated with the cloud computing tenant. In an implementation, the operations may include storing the metadata corresponding to the protected resources at the virtual machine. The hot-plug virtual disk may be mounted to the virtual machine by a host agent running at a virtualization host. Further, the hot-plug virtual disk may include a guest agent that initiates a recovery procedure. Also, the metadata corresponding to the protected resources may include an application item database location.

In an embodiment, a computing system for using hot-plug virtual disks in granular recovery may include one or more processors. The one or more processors may be configured to receive, at a cloud computing site, a backup configuration including a list of protected resources associated with a cloud computing tenant. The one or more processors may be further configured to mount a hot-plug virtual disk to a virtual machine including the protected resources associated with the cloud computing tenant. The one or more processors may also be configured to collect metadata corresponding to the protected resources associated with the cloud computing tenant. The one or more processors may additionally be configured to generate, at the cloud computing site, a backup of the virtual machine including the protected resources associated with the cloud computing tenant. Moreover, the one or more processors may be configured to store the metadata corresponding to the protected resources associated with the cloud computing tenant and store the backup of the virtual machine including the protected resources associated with the cloud computing tenant. In an implementation, the one or more processors may be configured to store the metadata corresponding to the protected resources at the virtual machine. The hot-plug virtual disk may be mounted to the virtual machine by a host agent running at a virtualization host. Further, the hot-plug virtual disk may include a guest agent that initiates a recovery procedure. Also, the metadata corresponding to the protected resources may include an application item database location.

In an embodiment, a method for using hot-plug virtual disks in granular recovery may include retrieving, at a cloud computing site, a list of protected resources associated with a cloud computing tenant included in a backup based upon, at least in part, metadata corresponding to the protected resources. The method may further include receiving, at the cloud computing site, an indication of one or more protected resources selected for recovery. The method may also include determining, at the cloud computing site, which virtual disk includes the protected resources selected for recovery based upon, at least in part, the metadata corresponding to the protected resources selected for recovery. The method may additionally include mounting a hot-plug virtual disk to a virtual machine associated with the cloud computing tenant, the hot-plug virtual disk including recovery instructions for facilitating recovery of the protected resources selected for recovery. Moreover, the method may include recovering the protected resources selected for recover to the virtual machine associated with the cloud computing tenant. The protected resources may include one or more application items. Further, a guest agent may initiate a recovery procedure and may pass information, describing which application items are to be recovered, to an application engine which may recover the application items.

In an embodiment, a computer program product may reside on a computer readable storage medium and may have a plurality of instructions stored on it. When executed by a processor, the instructions may cause the processor to perform operations for using hot-plug virtual disks in granular recovery. The operations may include retrieving, at a cloud computing site, a list of protected resources associated with a cloud computing tenant included in a backup based upon, at least in part, metadata corresponding to the protected resources. The operations may further include receiving, at the cloud computing site, an indication of one or more protected resources selected for recovery. The operations may also include determining, at the cloud computing site, which virtual disk includes the protected resources selected for recovery based upon, at least in part, the metadata corresponding to the protected resources selected for recovery. The operations may additionally include mounting a hot-plug virtual disk to a virtual machine associated with the cloud computing tenant, the hot-plug virtual disk including recovery instructions for facilitating recovery of the protected resources selected for recovery. Moreover, the operations may include recovering the protected resources selected for recovery to the virtual machine associated with the cloud computing tenant. The protected resources may include one or more application items. Further, a guest agent may initiate a recovery procedure and may pass information, describing which application items are to be recovered, to an application engine which may recover the application items.

In an embodiment, a computing system for using hot-plug virtual disks in granular recovery may include one or more processors. The one or more processors may be configured to retrieve, at a cloud computing site, a list of protected resources associated with a cloud computing tenant included in a backup based upon, at least in part, metadata corresponding to the protected resources. The one or more processors may also be configured to receive, at the cloud computing site, an indication of one or more protected resources selected for recovery. The one or more processors may be further configured to determine, at the cloud computing site, which virtual disk includes the protected resources selected for recovery based upon, at least in part, the metadata corresponding to the protected resources selected for recovery. The one or more processors may also be configured to mount a hot-plug virtual disk to a virtual machine associated with the cloud computing tenant, the hot-plug virtual disk including recovery instructions for facilitating recovery of the protected resources selected for recovery. The one or more processors may additionally be configured to recover the protected resources selected for recovery to the virtual machine associated with the cloud computing tenant. The protected resources may include one or more application items. Further, a guest agent may initiate a recovery procedure and may pass information, describing which application items are to be recovered, to an application engine which may recover the application items.

In an embodiment, a system may include a host agent running at a virtualization host that mounts a hot-plug virtual disk to a virtual machine associated with the virtualization host. The system may further include a guest agent included with the host agent that collects metadata related to application items associated with the virtual machine. The system may also include a cloud agent that passes a backup configuration including a list of protected resources associated with the virtual machine to the host agent. The protected resources may include the application items. Additionally, the system may include an application engine running at the virtual machine that recovers the application items during a recovery process.

The details of one or more implementations are set forth in the accompanying drawings and the description below. Other features and advantages will become apparent from the description, the drawings, and the claims.

DETAILED DESCRIPTION

Overview

The present disclosure is directed towards secure purposes and may provide access to data stored in a backup located in a cloud provider's network. Application data may usually be backed up from inside a guest operating system of a virtual machine and may be accessed through a network directly by an application. This may require backup storage and the application to be in the same network environment. Virtual machine mounting may be required in order to perform self-service granular application recovery. Keeping backup storage within the same network within a cloud computing tenant's virtual machine may not be required in a cloud environment, as backups may usually be provided as a service and may be managed by the cloud provider and may require the cloud provider to have full access to the network including the backups.

Providing an application running in a cloud tenant's network with secure access to data stored in a backup located in the cloud provider's network may not be desirable. Obtaining random access for an application to a large amount of data (like a whole database) stored in a backup without copying data inside virtual machine disks, which may be limited in size, may be a problem. One or more techniques or features of the present disclosure may eliminate the necessity of mounting the whole virtual machine from backup and may allow for mounting only a disk including the required database, where a backup may include the whole image of a virtual machine. In multitenant cloud environments a tenant may be limited in the number of virtual machines the tenant may run.

In view of the forgoing, there may be a need for self-service application granular recovery from an image of an entire virtual machine in a multitenant cloud environment using hot-plug virtual disks.

Figure 1:
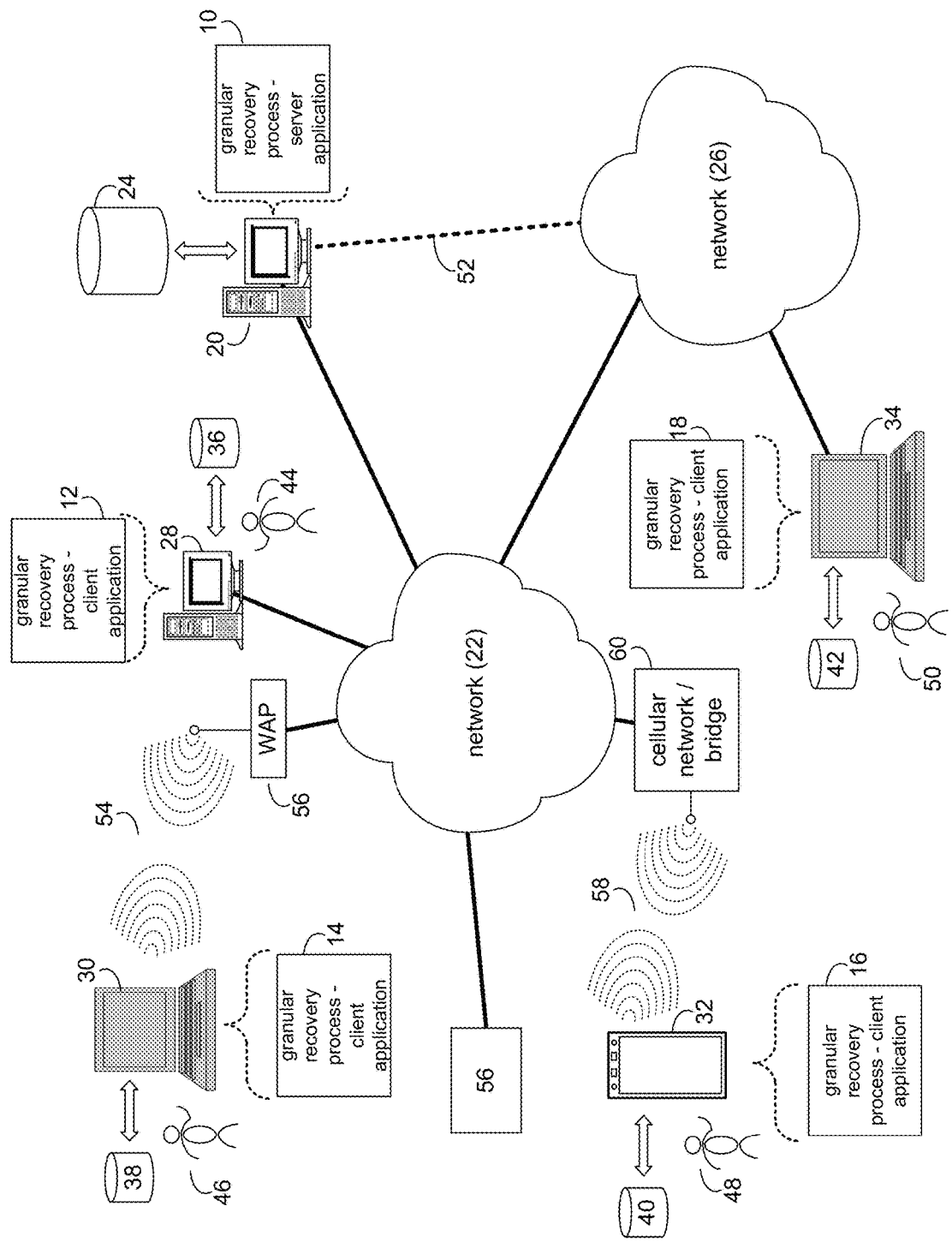
FIG. 1 depicts an example system that can execute implementations of the present disclosure.
Figure 3:
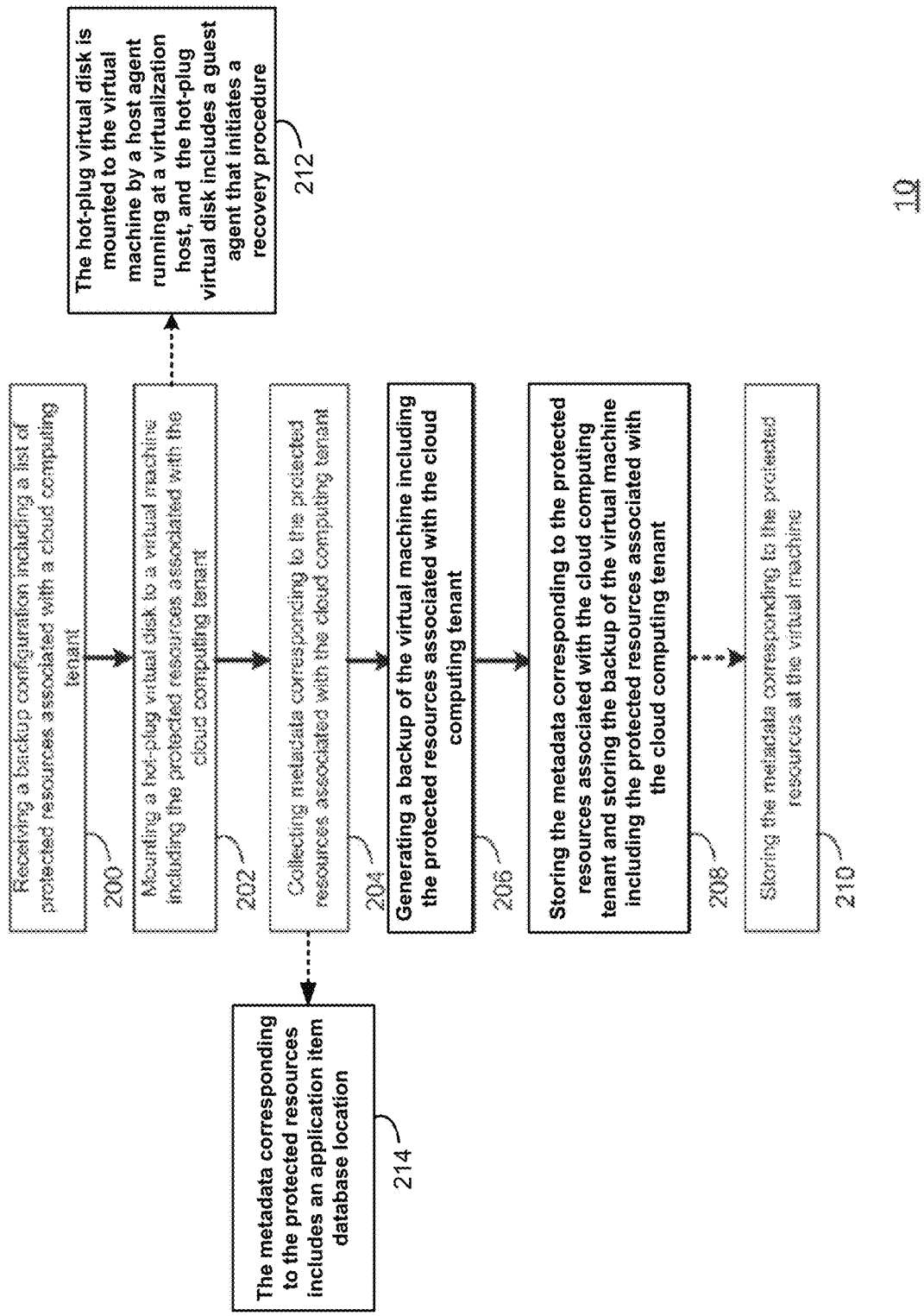
FIG. 3 depicts a flowchart illustrating an example process for granular recovery using hot-plug virtual disks.
Figure 4:
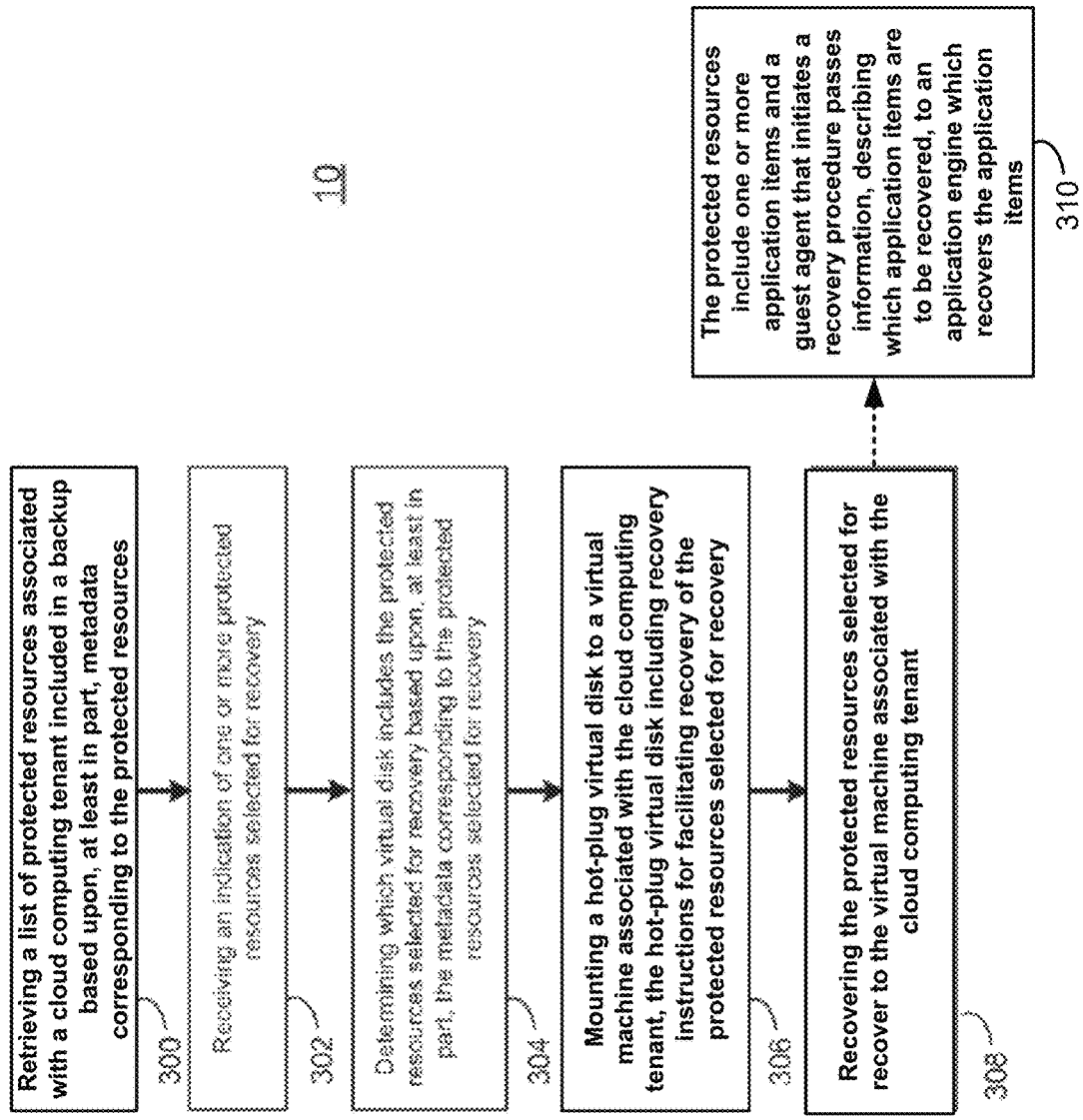
FIG. 4 depicts a flowchart illustrating an example process for granular recovery using hot-plug virtual disks.

Referring to FIGS. 1, 3, & 4, there is shown a server application 10 and client applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as granular recovery process 10. Further, one or more of client applications 12, 14, 16, and 18 may be referred to as a process configured to carry out one or more of the features described herein, such as granular recovery processes 12, 14, 16, and/or 18.

As will be discussed below, granular recovery process 10 may receive 200 a backup configuration including a list of protected resources associated with a cloud computing tenant. Granular recovery process 10 may also mount 202 a hot-plug virtual disk to a virtual machine including the protected resources associated with the cloud computing tenant. Granular recovery process 10 may further collect 204 metadata corresponding to the protected resources associated with the cloud computing tenant. Granular recovery process 10 may additionally generate 206 a backup of the virtual machine including the protected resources associated with the cloud computing tenant. Moreover, granular recovery process 10 may store 208 store the metadata corresponding to the protected resources associated with the cloud computing tenant and store the backup of the virtual machine including the protected resources associated with the cloud computing tenant. In an implementation, granular recovery process 10 may store 210 the metadata corresponding to the protected resources at the virtual machine.

In an embodiment, granular recovery process 10 may retrieve 300 a list of protected resources associated with a cloud computing tenant included in a backup based upon, at least in part, metadata corresponding to the protected resources. Granular recovery process 10 may further receive 302 an indication of one or more protected resources selected for recovery. Granular recovery process 10 may also determine 304 which virtual disk includes the protected resources selected for recovery based upon, at least in part, the metadata corresponding to the protected resources selected for recovery. Granular recovery process 10 may additionally mount 306 a hot-plug virtual disk to a virtual machine associated with the cloud computing tenant, the hot-plug virtual disk including recovery instructions for facilitating recovery of the protected resources selected for recovery. Moreover, granular recovery process 10 may recover 308 the protected resources selected for recover to the virtual machine associated with the cloud computing tenant.

The granular recovery process may be a server-side process (e.g., server-side granular recovery process 10), a client-side process (e.g., client-side granular recovery process 12, client-side granular recovery process 14, client-side granular recovery process 16, or client-side granular recovery process 18), or a hybrid server-side/client-side process (e.g., a combination of server-side granular recovery process 10 and one or more of client-side granular recovery processes 12, 14, 16, 18).

System Overview

Referring to FIG. 1, Server-side granular recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines. Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side granular recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side granular recovery processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side granular recovery processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side granular recovery processes 12, 14, 16, 18 and/or server-side granular recovery process 10 may be processes that run within (i.e., are part of) a cloud computing site, cloud computing application, cloud platform, or cloud environment. Alternatively, client-side granular recovery processes 12, 14, 16, 18 and/or server-side granular recovery process 10 may be stand-alone applications that work in conjunction with the cloud computing site, cloud computing application, cloud platform, or cloud environment. One or more of client-side granular recovery processes 12, 14, 16, 18 and server-side granular recovery process 10 may interface with each other (via network 22 and/or network 26).

Users 44, 46, 48, 50 may access server-side granular recovery process 10 directly through the device on which the client-side granular recovery process (e.g., client-side granular recovery processes 12, 14, 16, 18) is executed, namely client electronic devices 28, 30, 32, 34, for example. Users 44, 46, 48, 50 may access server-side granular recovery process 10 directly through network 22 and/or through secondary network 26. Further, server computer 20 (i.e., the computer that executes server-side granular recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Granular Recovery Process

The techniques and features described in the present disclosure may allow for backing up an entire virtual machine and granularly recovering applications data from the entire virtual machine backup. For example, an entire virtual machine backup may include two virtual disks. One of the virtual disks may include an operating system and applications, the other one may include application data (e.g., databases). Granular recovery process 10 may analyze the backup image, find and analyze metadata, and determine where the application data resides based on the metadata. For example, granular recovery process 10 may determine that the application data resides on virtual disk D: inside the backup image. Granular recovery process 10 may mount virtual disk D: including application data (e.g., a database or a mailbox, or a particular e-mail) from the image backup as a hot-plug disk to the original virtual machine running the application.

For the following discussion, server-side granular recovery process 10 will be described for illustrative purposes and server computer 20 will serve as a representation of a cloud computing site and be referred to as cloud computing site 20 which includes multiple server computers. It should be noted that server-side granular recovery process 10 may interact with client-side granular recovery process 12 and may be executed within one or more applications that allow for communication with client-side granular recovery process 12. However, this is not intended to be a limitation of this disclosure, as other configurations are possible (e.g., stand-alone, client-side granular recovery processes and/or stand-alone server-side granular recovery processes). For example, some implementations may include one or more of client-side granular recovery processes 12, 14, 16, 18 in place of or in addition to server-side granular recovery process 10.

Referring now to FIG. 1 one or more of users 44, 46, 48, and 50 may be cloud administrators at a cloud provider or may be cloud end-users. The cloud administrators may access and administer cloud computing site 20 (i.e., server computer 20) and the cloud-end users may access and interact with cloud computing site 20 through one or more of client electronic devices 28, 30, 32, 34 (respectively). Cloud computing site 20 may run a cloud or virtualization application such as VMware™ or may include bare-metal embedded hypervisors (e.g., VMware™ ESX™ and VMware™ ESXi™) that may run directly on server hardware at cloud computing site 20. Further, cloud computing site 20 may include a vCloud™ architecture that may enhance cooperation between hypervisors. Granular recovery process 10 may run at cloud computing site 20 and may include any number of the techniques or features described herein.

It may be desirable to give an application (running in tenant's network) secure access to data stored in a backup located in a cloud provider's network. A multitenant cloud platform (e.g., VMware vCloud Director, OpenStank, CloudStack and others) may provide multitenancy and may serve as an additional layer above a virtualization platform. A cloud agent may perform tenant authentication in a cloud platform and may provide a backup/recovery service for a cloud tenant's resources. A cloud agent may be available through a WAN via a web server. Backup storage may be where an image backup of a virtual machine with an application is located.

In an implementation, a guest agent may collect metadata related to application items during virtual machine image backup. The guest agent may also store metadata related to application items inside a virtual machine before a snapshot is taken. The guest agent may further run a granular application item recovery from a mounted database using an application engine.

In an implementation a host agent may execute a backup (e.g., image backup) of a cloud tenant's virtual machine. The host agent may further mount a virtual disk with a guest agent executable to a cloud tenant's virtual machine during backup. The host agent may also mount a virtual disk with a database from the backup to a cloud tenant's virtual machine during recovery. The host agent may additionally mount another virtual disk, including recovery instructions and/or an executable of a guest agent during recovery. A virtualization host may provide an infrastructure wherein the host agent operates.

Granular recovery process 10 may be configured to allow for authenticating in a cloud platform and may be configured to provide backup/recovery service for a cloud tenant's resources. Further, granular recovery process 10 may form a backup (e.g., image backup) of a virtual machine running an application and may save it to a backup archive. Granular recovery process 10 may also save additional information about application items (e.g., metadata) into the same backup archive.

When granular recovery of application items is necessary, a virtual machine disk including a database required for granular recovery may be mounted from the backup archive to a virtual machine running the application. Granular recovery process 10 may also mount an additional virtual disk to a cloud tenant's virtual machine. The virtual disk may include recovery instructions and/or an executable program (e.g., guest agent) capable of starting a recovery procedure inside a guest operating system. An application items recovery procedure (e.g., granular recovery process 10) may be initiated by a guest agent that may interact with the backup engine, and may provide access to a mounted disk with a database required for recovery.

Figure 2:
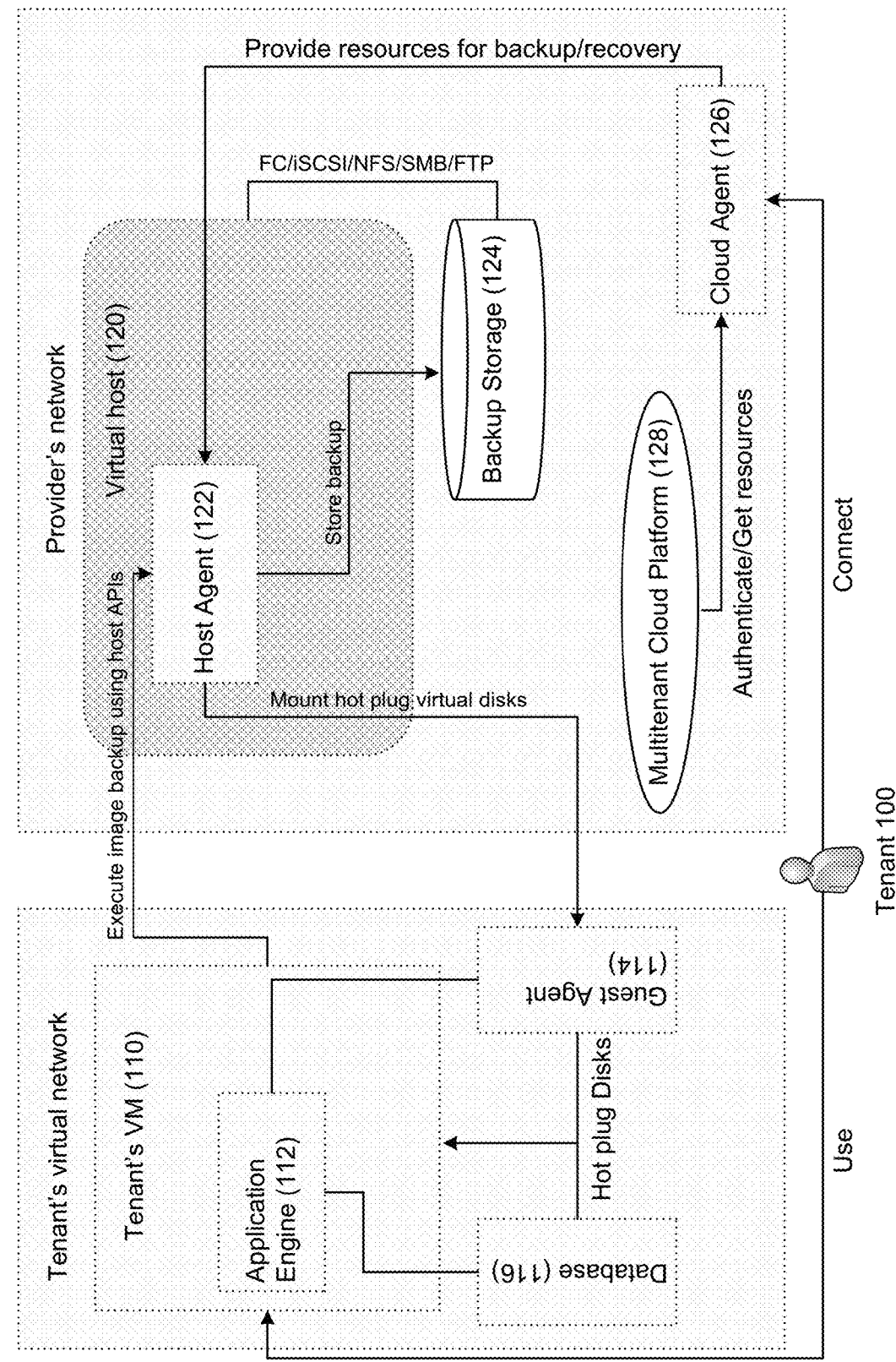
FIG. 2 depicts an example infrastructure in accordance with the present disclosure.

Referring now to FIG. 2, system elements, structure, and interaction in accordance with the present disclosure is shown. One or more techniques or features of the present disclosure may allow for secure access to data stored in a backup located in a cloud provider's network. A workflow in accordance with the present disclosure (e.g., granular recovery process 10) may include one or more of the following operations, which may allow for secure access to data stored in a backup located in a cloud provider's network.

Granular recovery process 10 may establish communication between tenant (100), via, e.g., one or more client electronic devices, and cloud agent (126) through HTTP/HTTPS. Cloud agent (126) may perform authentication in a multitenant cloud platform (128) and may acquire or receive a list of a cloud tenant's resources. Tenant (100) via, e.g., one or more client electronic devices may configure a backup routine. Cloud agent (126) may pass a backup configuration with a list of protected resources to host agent (122). In this way, granular recovery process 10 may receive 200 a backup configuration including a list of protected resources associated with a cloud computing tenant.

Host agent (122) may run on virtualization host (120) and may create a backup of a cloud tenant's virtual machine (110). In this way, granular recovery process 10 may generate 206 a backup of the virtual machine including the protected resources associated with the cloud computing tenant. The backup may include an image backup. Creating the backup may include establishing communication with backed up virtual machine (110) using host APIs. Creating the backup may also include mounting a hot-plug virtual disk including a guest agent (114) to a cloud tenant's virtual machine. In this way, granular recovery process 10 may mount 202 a hot-plug virtual disk to a virtual machine including the protected resources associated with the cloud computing tenant.

Creating the backup may further include collecting application metadata (e.g., information about application items and their structure) by guest agent (114) before a snapshot is created by host agent (122). In this way, granular recovery process 10 may collect 204 metadata corresponding to the protected resources associated with the cloud computing tenant. Creating the backup may additionally include storing meta information collected by guest agent (114) on one or more disks (e.g., virtual disks) associated with virtual machine (110). In this way, granular recovery process 10 may store 208 the metadata corresponding to the protected resources associated with the cloud computing tenant and may store the backup of the virtual machine including the protected resources associated with the cloud computing tenant. The metadata and the backup may be stored at a storage device inside or outside the cloud computing site. Further, creating the image backup may include saving the collected metadata to the backup archive located in backup storage (124) along with the virtual machine image (actual contents of the virtual machine disks). In this way, granular recovery process 10 may store 210 the metadata corresponding to the protected resources at the virtual machine.

Tenant (100) may, via, e.g., one or more client electronic devices, initiate and/or run an application granular recovery workflow. In this way granular recovery process 10 may recover 308 the protected resources selected for recovery to the virtual machine associated with the cloud computing tenant. The protected resources may be recovered from the hot-plug virtual disk and may be recovered by using recovery instructions or running a recovery executable. Running the application granular recovery may include accessing the backup image archive stored in a backup storage (124) (previously created) via host agent (122) and retrieving the list of application items stored in this backup. In this way, granular recovery process 10 may retrieve 300 a list of protected resources associated with a cloud computing tenant included in a backup based upon, at least in part, metadata corresponding to the protected resources. Running the application granular recovery may also include selecting items which are required to be recovered by tenant (100). In this way, granular recovery process 10 may receive 302 an indication of one or more protected resources selected for recovery. Granular recovery process 10 may determine 304 which virtual disk includes the protected resources selected for recovery based upon, at least in part, the metadata corresponding to the protected resources selected for recovery.

Running the application granular recovery may further include mounting (212) the hot-plug virtual disk that includes a database required for items recovery from a backup via host agent (122) and mounting the hot-plug virtual disk that contains a guest agent (114) executable via host agent (122) that may initiate a recovery procedure. In this way granular recovery process 10 may mount 306 a hot-plug virtual disk to a virtual machine associated with the cloud computing tenant. The hot-plug virtual disk may include recovery instructions for facilitating recovery of the protected resources selected for recovery. The hot-plug virtual disk may also include a database (116) and a recovery executable for facilitating recovery of the protected resources selected for recovery. Running the application granular recovery may additionally include running the mounted executable of guest agent (114) by tenant (110), initiating the recovery procedure via guest agent (114) using application engine (112) which may now access the database (116) through mounted virtual disk, finishing the recovery process by guest agent (114), dismounting the hot-plug disk, finishing the recovery process by host agent (122), and detecting that the hot-plug disks were dismounted from a virtual machine. The same backup archive may be used to recover an entire virtual machine back to an original or new location with all its disks and their contents.

In implementation, mounting a hot-plug disk may be a hypervisor feature allowing attachment of a virtual disk to a virtual machine while the virtual machine is up and running. For example one virtual disk (e.g., including the guest agent) may be attached to an original virtual machine during a backup operation, and two virtual disks during a recovery operation (one of them including the guest agent, and another one being a mounted virtual disk of a virtual machine, including application databases).

A guest agent may be executed before a virtual machine backup to collect application metadata and store it inside the virtual machine's original virtual disk in a special location. A guest agent may also initiate a recovery procedure (310) and/or be executed during recovery to interface with an application engine and pass information to the application engine describing which application items (i.e., protected resources) are to be recovered and the application engine may do the actual recovery of application's data.

In implementation, the metadata (214) described herein, which may correspond to or describe the protected resources, may include information about where application items (databases, mailboxes, mails, etc.) are actually stored or an application item database location. For example, from metadata, granular recovery process 10 may determine that SQL database X is located in D:\Program Data\SQL Server\databases\folder, or that mailbox Y is stored in a database Y, located in F:\Program Data\MS Exchange\folder. The guest agent may collect this metadata before backup starts and may store it in a pre-defined location on one of the virtual machine's disks (e.g., disk C:) that will be backed up. During recovery, host agent may look inside the backup to find this metadata on backed up disk C:. Based on this metadata, the host agent may present the application items to the cloud end-user or tenant and allow for the cloud end-user or tenant to select items for recovery. Once the cloud end-user or tenant has selected items for recovery, the host agent determine from the metadata on which particular virtual disk(s) of a backed up virtual machine the items for recovery reside and mount that/those particular virtual disk(s) from a backup to the original virtual machine.

One or more of the techniques and features described herein may be included in a software application such as, for example, an advanced backup software including but not limited to Acronis Backup Advance. The software application may be configured to provide one or more of image backup for live machines, bare-metal restore on different hardware, migration between different hypervisors and physical machines, and VMware ESXi hypervisor backup and BMR Virtualization may be standard for smaller environments. New servers may be virtual by default. Virtualization may bring lower costs, fewer servers, higher resource utilization, application isolation and lower license costs.

Small environments may have specific needs for a backup solution such as a complete, efficient, and easy-to-use solution. A typical environment may include an active directory, a file server, exchange servers (2), SharePoints (2), SQL-based LOB apps (2), and accounting systems (1).

Virtualization may enable better backup (hypervisor-lever backup, no agent installation required inside a virtual machine, less CPU/RAM consumption, easy and unified management, recover to virtual and physical hosts, cold stand-by replica with very low resource consumption). Free tools may include inefficient technology or license limitations that make them slow, unreliable or limited. Advanced solutions may include multi-hypervisor support, too complex features, and extensive scalability which may lead to over-complexity and high cost.

Advanced backup software may include components for managed machines such as agents, which may be applications that perform data backup, recovery and other operations on the machines managed. Agents may require a license to perform operations on each managed machine. The advanced backup software may further include one or more components for centralized management. The advanced backup software may also include a console, which may provide one or more graphical user interfaces to other advanced backup software components. The advanced backup software may additionally include a bootable media builder through which bootable media may be created to facilitate use of the agents and other utilities in a rescue environment. The one or more agents may enable disk level and file-level protection for systems running Windows™, Linux™, VMware™, Hyper-V™, Exchange™, and/or SQL™ software applications.

The advanced backup software may expand backup and recovery capabilities in physical, virtual, and cloud environments. For example, the advanced backup software may provide express full backup functionality, which may be based on monitoring changes of database files. Once an initial full backup is taken, all subsequent backups may only back up changes to a database without needing to read the entire database file. Combining this method with data deduplication functionality may make it possible to back up large databases of 1 TB or more during business hours and even over WANs. The advanced backup software may also provide database clustering support. A user may choose to backup up database replicas rather than active databases for minimal production impact. The advanced backup software may additionally provide continuous data protection, which may allow for reverting database data to almost any point in time. If the most recent transaction log file survived, a user may revert the database data to the point of failure. Example Software and Hardware Related Implementations A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "server," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or inter-network generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for using hot-plug virtual disks in granular recovery, the method comprising:
    receiving, at a cloud computing site, a backup configuration including a list of protected resources associated with a cloud computing tenant;
    mounting a hot-plug virtual disk comprising a guest agent to a virtual machine including the protected resources associated with the cloud computing tenant, wherein the guest agent is executable by a host agent and interfaces with an application engine;
    collecting metadata, during virtual machine image backup, using the guest agent, the metadata corresponding to the protected resources associated with the cloud computing tenant;
    generating, at the cloud computing site, a backup of the virtual machine including the protected resources associated with the cloud computing tenant, wherein the backup includes a first virtual disk including an operating system and applications of the virtual machine and a second virtual disk including application data and a database for granular recovery, wherein application engine may access the database after hot-plug virtual disk is mounted; and
    storing the metadata corresponding to the protected resources associated with the cloud computing tenant inside the virtual machine before a virtual machine backup occurs; and
    storing the backup of the virtual machine including the protected resources associated with the cloud computing tenant inside the virtual machine.

2. The method of claim 1 further comprising running a granular recovery application using the guest agent, wherein the metadata corresponding to the protected resources includes an application item database location stored in the database.

3. A computing system for using hot-plug virtual disks in granular recovery, the computing system comprising one or more processors, wherein the one or more processors are configured to:
    receive, at a cloud computing site, a backup configuration including a list of protected resources associated with a cloud computing tenant;
    mount a hot-plug virtual disk to a virtual machine including the protected resources associated with the cloud computing tenant, the hot-plug virtual disk comprising a guest agent, wherein the guest agent interfaces with an application engine;
    collect metadata, using the guest agent, corresponding to the protected resources associated with the cloud computing tenant;
    generate, at the cloud computing site, a backup of the virtual machine including the protected resources associated with the cloud computing tenant, wherein the backup includes a first virtual disk including an operating system and applications of the virtual machine and a second virtual disk including application data and a database for recovery items, wherein application engine may access the database after hot-plug virtual disk is mounted;
    store the metadata corresponding to the protected resources associated with the cloud computing tenant at a pre-defined location on one of the virtual machine's disk;
    store the backup of the virtual machine including the protected resources associated with the cloud computing tenant; and
    initiate a granular recovery procedure, using the guest agent and the application engine.

4. The computing system of claim 3, wherein the one or more processors are further configured to:
    store the metadata corresponding to the protected resources at the virtual machine.

5. The computing system of claim 3, wherein the metadata corresponding to the protected resources includes an application item database location.

6. A method for using hot-plug virtual disks in granular recovery, the method comprising:
    retrieving, at a cloud computing site, using a host agent, a list of protected resources associated with a cloud computing tenant included in a backup based upon, at least in part, metadata corresponding to the protected resources;
    receiving, at the cloud computing site, an indication of one or more protected resources selected for recovery;
    determining, at the cloud computing site, which of a first virtual disk including an operating system and applications of the virtual machine and a second virtual disk including application data and a database that includes the protected resources selected for recovery, by an application engine, based upon, at least in part, the metadata corresponding to the protected resources selected for recovery;
    mounting a hot-plug virtual disk to a virtual machine associated with the cloud computing tenant, the hot-plug virtual disk comprising a guest agent, the hot-plug virtual disk including recovery instructions for facilitating recovery of the protected resources selected for recovery from at least one of the first virtual disk including the operating system and the applications of the virtual machine and the second virtual disk including the application data and the database of the virtual machine, wherein guest agent interfaces with application engine and is executable by the host agent; and
    recovering, using the guest agent and the application engine, the protected resources selected for recovery from at least one of the first virtual disk including the operating system and the applications of the virtual machine and the second virtual disk including the application data and the database of the virtual machine to the virtual machine associated with the cloud computing tenant, the guest agent executable by the host agent.

7. The method of claim 6, wherein the protected resources include one or more application items and wherein the guest agent that initiates a recovery procedure passes information, describing which application items are to be recovered, to the application engine which recovers the application items.

8. A computing system for using hot-plug virtual disks in granular recovery, the computing system comprising one or more processors, wherein the one or more processors are configured to:
   retrieve, at a cloud computing site, using a host agent, a list of protected resources associated with a cloud computing tenant included in a backup image archive based upon, at least in part, metadata corresponding to the protected resources;
   receive, at the cloud computing site, an indication of one or more protected resources selected for recovery;
   determine, at the cloud computing site, which of a first virtual disk including an operating system and applications of the virtual machine and a second virtual disk including application data and a database of the virtual machine includes the protected resources selected for recovery based upon, at least in part, the metadata corresponding to the protected resources selected for recovery, by an application engine, the protected resources selected for recovery include one or more application items;
   mount a hot-plug virtual disk to a virtual machine associated with the cloud computing tenant, the hot-plug virtual disk comprising a guest agent, the hot-plug virtual disk including recovery instructions for facilitating recovery of the protected resources selected for recovery from at least one of the first virtual disk including the operating system and the applications of the virtual machine and the second virtual disk including the application data and the database that includes the protected resources selected for recovery the guest agent executable by the host agent, wherein the guest agent interfaces with an application engine; and
   recover the protected resources selected for recovery, using the guest agent and the application engine, from at least one of the first virtual disk including the operating system and the applications of the virtual machine and the second virtual disk including the application data and the database to the virtual machine associated with the cloud computing tenant by running the recovery executable, wherein application engine may access the database after hot-plug virtual disk is mounted.

9. The computing system of claim 8, wherein the protected resources selected for recovery include one or more application items and wherein the guest agent that initiates a recovery procedure passes information, describing which application items are to be recovered, to an application engine which recovers the application items.

* * * * *